(12) United States Patent
Barnes et al.

(10) Patent No.: US 9,528,171 B2
(45) Date of Patent: Dec. 27, 2016

(54) ALLOY FOR SEAL RING, SEAL RING, AND METHOD OF MAKING SEAL RING FOR SEAL ASSEMBLY OF MACHINE

(71) Applicant: Caterpillar Inc., Peoria, IL (US)

(72) Inventors: Christopher A. Barnes, Peoria, IL (US); George B. Kokos, Dunlap, IL (US); James O. Barlow, Metamora, IL (US); Jason R. Beckerdite, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 1 day.

(21) Appl. No.: 14/827,853

(22) Filed: Aug. 17, 2015

(65) Prior Publication Data
US 2016/0076122 A1 Mar. 17, 2016

Related U.S. Application Data

(60) Provisional application No. 62/051,035, filed on Sep. 16, 2014.

(51) Int. Cl.
*F16J 15/34* (2006.01)
*C22C 19/05* (2006.01)
*F16J 15/08* (2006.01)

(52) U.S. Cl.
CPC ............. *C22C 19/058* (2013.01); *C22C 19/05* (2013.01); *C22C 19/056* (2013.01);
(Continued)

(58) Field of Classification Search
CPC ................ F16J 15/0806; F16J 15/3496; C22C 19/03–19/058
(Continued)

(56) References Cited

U.S. PATENT DOCUMENTS 3,758,296 A 9/1973 Johnson
4,100,019 A * 7/1978 Groff ..................... G21C 13/02
137/590
(Continued)

FOREIGN PATENT DOCUMENTS

JP 2004-131840 A 4/2004
JP 2008-304059 A 12/2008
JP 2009-500521 A 1/2009

OTHER PUBLICATIONS

Mtek CY-40 alloy standard accessed via www.matweb.com.*
(Continued)

*Primary Examiner* — Kristina Fulton
*Assistant Examiner* — Nathan Cumar
(74) *Attorney, Agent, or Firm* — Leydig, Voit & Mayer, Ltd.

(57) ABSTRACT

A seal ring for a seal assembly includes a body and a seal flange. The body is generally cylindrical and extends along a longitudinal axis between a load end and a seal end. The seal flange is disposed at the seal end of the cylindrical body. The seal flange circumscribes the body and projects radially from the body to a distal perimeter of the seal flange. The seal flange includes a sealing face which is annular and disposed adjacent the distal perimeter. The seal ring is made from an alloy that includes between 8 percent and 13 percent by weight of iron, between 2 percent and 3 percent by weight of silicon, between 13 percent and 14 percent by weight of chromium, and at least 65 percent by weight of nickel.

20 Claims, 8 Drawing Sheets

(52) U.S. Cl.
CPC ......... *F16J 15/0806* (2013.01); *F16J 15/344* (2013.01); *F16J 15/3496* (2013.01)

(58) Field of Classification Search
USPC .................................. 277/406; 420/441–460
See application file for complete search history.

(56) References Cited

U.S. PATENT DOCUMENTS

| | | | |
|---|---|---|---|
| 4,118,254 A * | 10/1978 | Knotek | B23K 35/304 |
| | | | 420/445 |
| 4,819,999 A | 4/1989 | Livesay et al. | |
| 4,965,139 A * | 10/1990 | Kabacoff | C23C 14/16 |
| | | | 148/403 |
| 5,217,321 A | 6/1993 | Corcoran et al. | |
| D338,898 S | 8/1993 | Corcoran et al. | |
| 6,656,293 B2 | 12/2003 | Black et al. | |
| 7,553,555 B2 | 6/2009 | Cortese et al. | |
| 7,604,680 B2 | 10/2009 | Shamblen et al. | |
| 7,708,842 B2 | 5/2010 | Zurfluh | |
| 8,177,929 B2 | 5/2012 | Zurfluh | |
| 8,424,980 B2 | 4/2013 | Fischer et al. | |
| 8,551,266 B2 | 10/2013 | Imamovic et al. | |
| 8,678,522 B2 | 3/2014 | Fischer et al. | |
| 8,726,974 B2 | 5/2014 | Barlow et al. | |
| 2002/0150481 A1* | 10/2002 | Adamovski | F01C 1/20 |
| | | | 417/310 |
| 2003/0107188 A1 | 6/2003 | Spence et al. | |
| 2003/0132415 A1 | 7/2003 | Chigasaki et al. | |
| 2007/0045966 A1* | 3/2007 | Jiang | F16J 15/344 |
| | | | 277/404 |
| 2008/0233303 A1 | 9/2008 | Jiang et al. | |
| 2008/0236536 A1 | 10/2008 | Jensen et al. | |
| 2009/0053554 A1 | 2/2009 | Strock et al. | |
| 2009/0311545 A1 | 12/2009 | Gerke et al. | |
| 2010/0215849 A1 | 8/2010 | Fischer et al. | |
| 2011/0185993 A1 | 8/2011 | McKimpson et al. | |
| 2012/0058710 A1 | 3/2012 | Ma | |
| 2012/0070585 A1 | 3/2012 | Sebright | |
| 2012/0189488 A1 | 7/2012 | Halleqvist | |
| 2012/0297649 A1 | 11/2012 | Gomar | |
| 2012/0304954 A1 | 12/2012 | Kiser et al. | |
| 2012/0312159 A1 | 12/2012 | Liu et al. | |
| 2013/0157081 A1 | 6/2013 | Liu et al. | |
| 2013/0221739 A1 | 8/2013 | Fischer et al. | |
| 2013/0258332 A1 | 10/2013 | Iga | |
| 2014/0131952 A1 | 5/2014 | Kirov et al. | |
| 2014/0141930 A1 | 5/2014 | Gerke et al. | |
| 2014/0175753 A1 | 6/2014 | Antoine | |

OTHER PUBLICATIONS

NiDi guidelines . . . reference book, Nickel Development Institute, 1994.*
Agarwal, Nickel base alloy . . . —Anti coorrosion methods and materials, 2001.*
Mtek CY-40.*
Agarwal, "Nickel base alloys and newer 6Mo stainless steels meet corrosion challenges of the modern day chemical process industries," *Anti-Corrosion Methods and Materials*, 48(5), 2001, pp. 287-297.

* cited by examiner

ALLOY FOR SEAL RING, SEAL RING, AND METHOD OF MAKING SEAL RING FOR SEAL ASSEMBLY OF MACHINE

CROSS-REFERENCE TO RELATED APPLICATION

This patent application claims the benefit of priority to U.S. Patent Application No. 62/051,035, filed Sep. 16, 2014, and entitled "Alloy for Seal Ring, Seal Ring, and Method of Making Seal Ring for Seal Assembly of Machine," which application is incorporated in its entirety herein by this reference.

TECHNICAL FIELD

This patent disclosure relates generally to an alloy for a seal ring of a seal assembly for machinery and equipment and, more particularly, to an alloy for a seal ring of a seal assembly having a rotary face-to-face contacting relationship via a pair of seal rings.

BACKGROUND

The seal environment in a machine, such as, an off-highway truck, for example, can include high pressure, high speed, and high deflection between relatively movable components. A seal assembly of the kind employed for retaining lubricant within a sealed cavity and excluding foreign matter from the bearing surfaces between relatively moving parts disposed within the sealed cavity can comprise a face-type seal wherein sealing is accomplished by mating surfaces of relatively rotating seal parts of hard material.

In seals which employ two rings relatively rotating in face-to-face contact, the economical production of sealing surfaces which will endure and maintain a seal throughout many hours of severe service is highly desired. For example, the cost of the material from which the seal rings of such a seal assembly are made can be expensive. It would be advantageous to avoid using high-cost materials in the production of such seal rings while maintaining a comparable performance to those that use higher-priced stock.

U.S. Pat. No. 3,758,296 is entitled, "Corrosion Resistant Alloy." The '296 patent is directed to a nickel-base, corrosion-resistant alloy consisting of the following in percentage ranges by weight: Ni (26-48%); Cr (30-34%); Mo (4-5.25%): Co (4-7.5%); Fe (to 25%); Mn (1-3.5%); Cu (2.5-8.0%); C (0.05-0.25%); Si (to 4.0%); and B (to 0.10%).

It will be appreciated that this background description has been created by the inventor to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In embodiments, the present disclosure describes an alloy for a seal ring of a seal assembly. The alloy includes between 8 percent and 13 percent by weight of iron, between 2 percent and 3 percent by weight of silicon, between 13 percent and 14 percent by weight of chromium, and at least 65 percent by weight of nickel.

In other embodiments, a seal ring for a seal assembly includes a body and a seal flange. The body is generally cylindrical and extends along a longitudinal axis between a load end and a seal end. The seal flange is disposed at the seal end of the body. The seal flange circumscribes the body and projects radially from the body to a distal perimeter of the seal flange. The seal flange includes a sealing face which is annular and disposed adjacent the distal perimeter. The seal ring is made from an alloy that includes between 8 percent and 13 percent by weight of iron, between 2 percent and 3 percent by weight of silicon, between 13 percent and 14 percent by weight of chromium, and at least 65 percent by weight of nickel.

In other embodiments, a method of making a seal ring includes producing a seal ring from an alloy and machining the seal ring to at least one predetermined tolerance. The alloy includes between 8 percent and 13 percent by weight of iron, between 2 percent and 3 percent by weight of silicon, between 13 percent and 14 percent by weight of chromium, and at least 65 percent by weight of nickel.

Further and alternative aspects and features of the disclosed principles will be appreciated from the following detailed description and the accompanying drawings. As will be appreciated, the alloys, seal rings for a seal assembly, and methods of making a seal ring for a seal assembly disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Embodiments of alloys, seal rings for a seal assembly, and methods of making a seal ring for a seal assembly are described herein. In embodiments, an alloy for a seal ring of a seal assembly includes between 8 percent and 13 percent by weight of iron, between 2 percent and 3 percent by weight of silicon, between 13 percent and 14 percent by weight of chromium, and at least 65 percent by weight of nickel. In embodiments, the alloy includes between 65 percent and 75 percent by weight of nickel. In embodiments, the alloy also includes between 2 percent and 3 percent by weight of boron. In still other embodiments, the alloy also includes between 0.6 percent and 1 percent by weight of carbon. In embodiments, the alloy does not contain more than trace amounts of molybdenum, cobalt, manganese, or copper, or, in other embodiments, any two of the foregoing, any three of the foregoing, or all of the foregoing.

In embodiments, a seal ring for a seal assembly can be made from an alloy according to principles of the present disclosure using any suitable method of making a seal ring. In embodiments, the seal ring includes a body and a seal flange. The body is generally cylindrical and extends along a longitudinal axis between a load end and a seal end. The seal flange is disposed at the seal end of the cylindrical body. The seal flange circumscribes the body and projects radially from the body to a distal perimeter of the seal flange. The seal flange includes a sealing face which is annular and disposed adjacent the distal perimeter.

Figure 1:
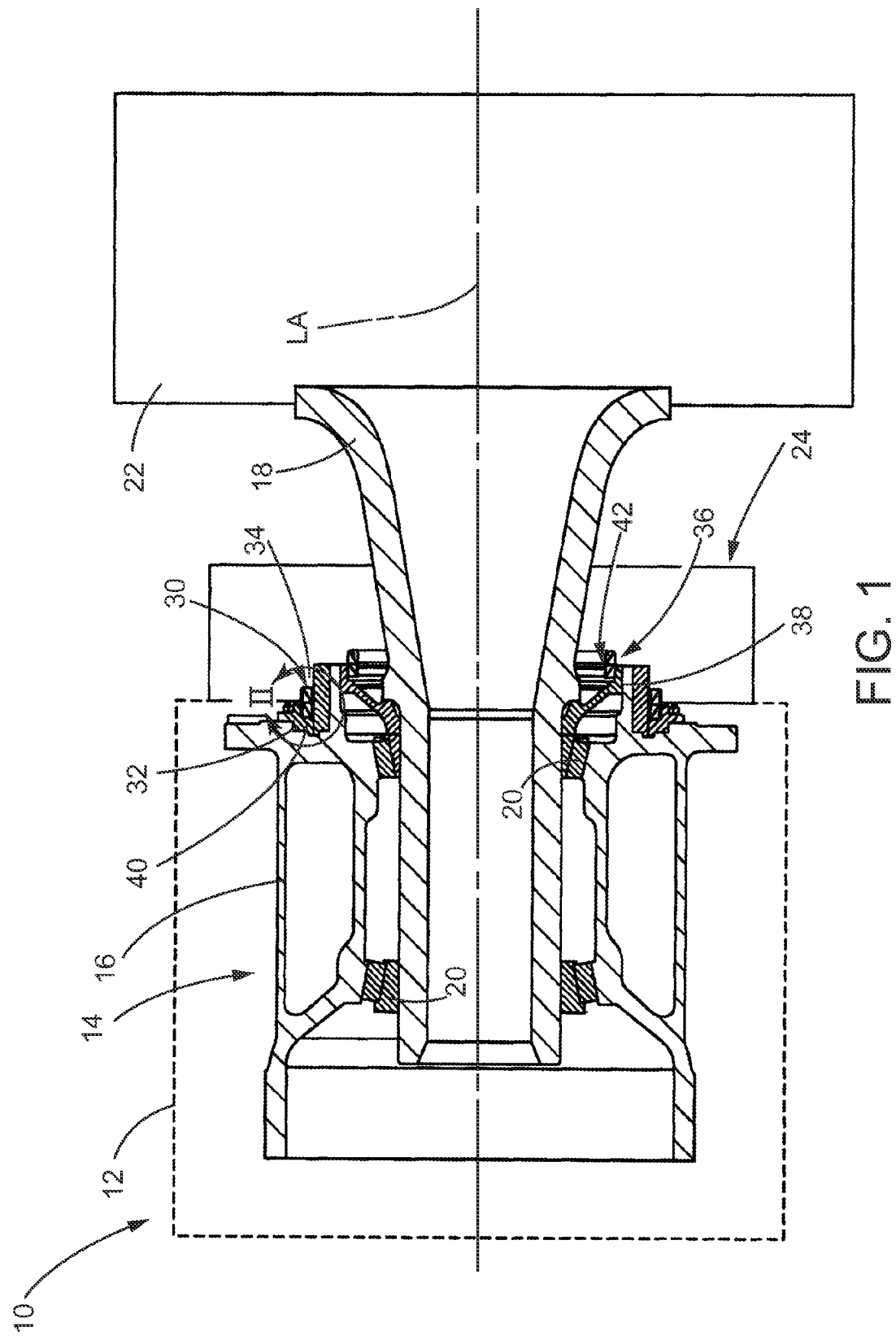
FIG. 1 is a partially-sectioned, diagrammatic side view of an embodiment of a machine having a face seal assembly constructed in accordance with principles of the present disclosure.

Referring now to the drawings and in particular to FIG. 1, an embodiment of a machine 10 is shown schematically. The machine 10 include a housing or frame 12 having a wheel assembly 14 coupled therewith. The wheel assembly 14 includes a hub 16, a rotatable spindle 18 journaled with the hub 16 via bearings 20, and a wheel 22 mounted to the rotatable spindle 18. The machine 10 include a brake system 24 which is arranged with the wheel assembly 14 and configured to selectively stop the rotation of the wheel 22 with respect to the hub 16.

A seal assembly 30 constructed according to principles of the present disclosure can provide a running seal between a first member 32 which is mounted to the hub 16 of the wheel assembly 14 and a second member 34 which is in the form of a brake housing of the brake system 24. The brake housing 34 is fixed to the rotatable spindle 18 such that the brake housing 34 is rotatable with respect to the first member 32 about a rotational axis which is aligned with a longitudinal axis "LA" defined by the spindle 18. The seal assembly 30 is disposed between the first member 32 and the second member 34.

A second seal assembly 36 constructed according to principles of the present disclosure is provided to form a second running seal between first and second members 38, 34 of the machine 10 which are rotatable with respect to each other about a longitudinal axis "LA." In embodiments, the first and second seal assemblies 30, 36 can be substantially the same. In yet other embodiments, the second seal assembly 36 can be different from the first seal assembly 30.

The first seal assembly 30, which is in the form of a metal-to-metal face seal assembly, is disposed in a first seal cavity 40 axially extending between the first member 32 and the second member 34. The second member 34 in the form of the brake housing is rotatable about the longitudinal axis "LA" relative to the first member 32 with the first seal assembly 30 providing a running seal therebetween. The second seal assembly 36 is similarly disposed in a second seal cavity 42. In embodiments, the first and second seal assemblies 30, 36 can be used to retain brake cooling fluid and/or a lubricant. In other embodiments, a seal assembly constructed according to principles of the present disclosure can be used in other applications, as will be recognized by one skilled in the art.

In embodiments, the machine 10 can be any suitable machine, such as a wheel loader, a backhoe, an excavator, a material handler and the like. In embodiments, the machine 10 comprises other types of equipment that include pivotal linkage arrangements which utilize a seal ring, a seal assembly, and a joint having a seal assembly constructed in accordance with principles of the present disclosure. Examples of other such machines include machines used for compaction, mining, construction, farming, transportation, etc. While the present disclosure may be implemented in the context of a wheel assembly, it is not thereby limited. A wide variety of other applications are contemplated, including various components of track-type tractors such as track seals, track roller and carrier roller seals, pin joint assemblies and cartridges, final drive arrangements, auger drive/support arrangements, and other suitable machine system wherein rotatable seal assemblies are utilized.

The first and second members can be rotatable relative to one another about the longitudinal axis "LA" with the seal assembly 30 providing a means for fluidly sealing the first member 32 and the second member 34 with a running seal therebetween. In embodiments, the first member 32 can comprise a component mounted to the frame 12 or otherwise stationary with respect to the frame 12, and the second member 34 can comprise a component which is rotatably movable with respect to the first member 32 about the longitudinal axis "LA." In other embodiments, the second member 34 can be stationary and the first member 32 is rotatable with respect to the frame 12. It should be understood, however, that the use of the terms "first," "second," and the like herein is for convenient reference only and is not limiting in any way.

The illustrated first and second seal assemblies 30, 36 are substantially identical to each other. It should be understood, therefore, that the description of one seal assembly is applicable to the other seal assembly, as well.

Figure 2:
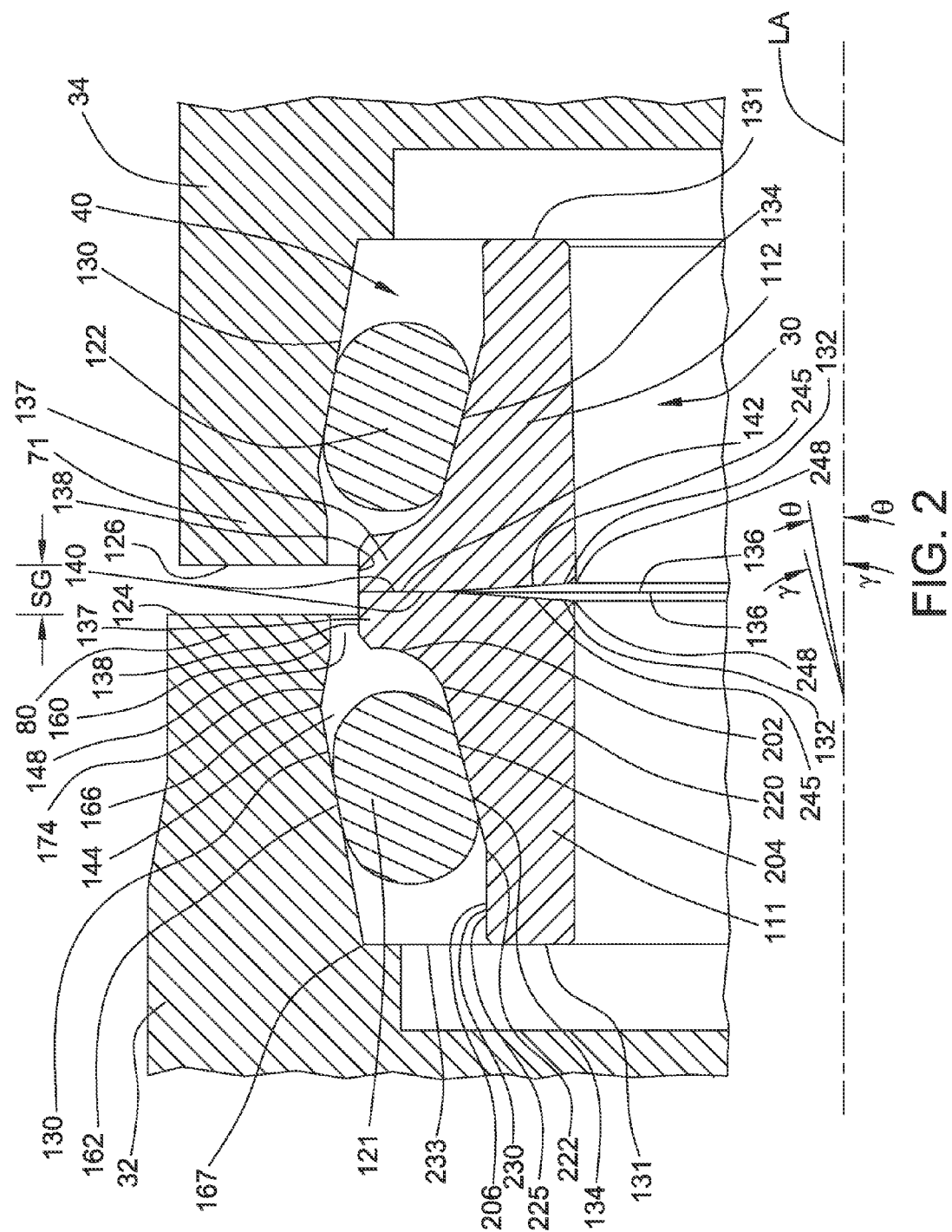
FIG. 2 is a sectioned diagrammatic view of an embodiment of a seal ring for a face seal assembly, which is constructed in accordance with principles of the present disclosure corresponding to the location encompassed by circle II in FIG. 1.

Referring to FIG. 2, the first seal assembly 30 is shown. The first member 32 is rotatable about the longitudinal axis "LA" with respect to the second member 34. The first member 32 and the second member 34 are disposed in spaced relationship to each other such that they are separated by a seal gap distance "SG" along the longitudinal axis "LA." During use, the first member 32 and the second member 34 can move axially with respect to each other along the longitudinal axis "LA," thereby varying the seal gap distance "SG."

The first seal assembly 30 includes first and second seal rings 111, 112 and first and second load rings 121, 122, which are all annular. The first and second seal rings 111, 112 and the first and second load rings 121, 122 are disposed in the first seal cavity 40 between the first member 32 and the second member 34. The first and second seal rings 111, 112 of the first seal assembly 30 are disposed in abutting relationship with each other. The first and second load rings 121, 122 are respectively mounted to the first and second seal rings 111, 112. The first and second seal rings 111, 112 can be made from an alloy following principles of the present disclosure. The first and second load rings 121, 122 are preferably made from a suitable elastomeric material (e.g., nitrile, low temperature nitrile, hydrogenated nitrile (HNBR), silicone, or viton).

In the first seal assembly 30, the first load ring 121 acts as a gasket and sealingly engages the first member 32 and the first seal ring 111 to provide a fluid-tight seal therebetween. The second load ring 122 acts as a gasket and sealingly engages the second member 34 and the second seal ring 112 to provide a fluid-tight seal therebetween.

An outboard end portion 124 of the first member 32 is in proximal relation to an inboard end portion 126 of the second member 34. The outboard end portion 124 of the first member 32 and the inboard end portion 126 of the second member 34 each includes a load ring engagement surface 130. The load ring engagement surfaces 130 of the first member 32 and the second member 34 define, at least in part, the first seal cavity 40, which extends axially and is interposed between the first member 32 and the second member 34. It will be understood that the members 38, 34 cooperate in a similar manner to define, at least in part, the second seal cavity 42.

The load ring engagement surfaces 130 are generally annular and are coaxial with the longitudinal axis "LA." In the illustrated embodiment, the load ring engagement surfaces 130 maintain the cross-sectional shape shown in FIG. 2 substantially continuously around the entire circumference circumscribed around the longitudinal axis "LA" by the first and second members 32, 34.

The first and second seal rings 111, 112 are substantially identical to each other. The first and second seal rings 111, 112 are each in the form of an annulus. The first and second seal rings 111, 112 are rotationally movable with respect to each other about the longitudinal axis "LA." In this arrangement, the first seal ring 111 can be considered a stationary seal ring as it is rotatively coupled with the first member 32. The second seal ring 112 can be considered a rotational seal ring as it is coupled with the second member 34 which is mounted to the rotatable spindle 18 and can rotate relative to the first member 32 about the longitudinal axis "LA."

The first and second seal rings 111, 112 each has a load end 131 and a seal end 132 in spaced relationship to each other along the longitudinal axis "LA," a ramped or inclined loading surface 134, which is axially extending, and a sealing face 136, which is disposed at the seal end 132 and extends radially with respect to the longitudinal axis "LA." The first seal ring 111 and the second seal ring 112 abut one another such that the sealing faces 136 of the first seal ring 111 and the second seal ring 112 are in contacting relationship with each other.

The sealing face 136 is defined by a seal flange 137, which is radially-extending. The sealing faces 136 of the first and second seal rings 111, 112 form a radially-extending annulus and are in sealing relationship with each other.

Each sealing face 136 extends radially to an outer or distal perimeter 138. Each sealing face 136 has a sealing band 140 disposed adjacent the outer perimeter 138. The first and second seal rings 111, 112 abut one another such that the sealing bands 140 of the first and second seal rings 111, 112 are in contacting relationship with each other.

The first and second load rings 121, 121 are respectively mounted to the first and second seal rings 111, 112. The first and second load rings 121, 122 resiliently support the first and second seal rings 111, 112, respectively. The first load ring 121 engages the inclined loading surface 134 of the first seal ring 111, and the second load ring 122 engages the inclined loading surface 134 of the second seal ring 112.

The first seal assembly 30 employs dual cones in the form of the first and second seal rings 111, 112. Axial loading of the first and second seal rings 111, 112 along the longitudinal axis "LA" is accomplished by means of the first and second load rings 121, 122. The tapered conical or inclined loading surfaces 134 are formed along the outside surface of the first and second seal rings 111, 112 to receive the first and second load rings 121, 122, respectively. The load ring engagement surfaces 130 of the first and second members 32, 34 are positioned in corresponding, confronting inclined relation with the inclined loading surfaces 134 of the first and second seal rings 111, 112 so as to contain the first and second load rings 121, 122, respectively, therebetween. Axial loading of the first and second seal rings 111, 112 is thus accomplished through the axial loading of the first and second load rings 121, 122, respectively.

The first load ring 121 is compressed such that it engages the load ring engagement surface 130 of the first member 32 and the inclined loading surface 134 of the first seal ring 111. The second load ring 122 is compressed such that it engages the load ring engagement surface 130 of the second member 34 and the inclined loading surface 134 of the second seal ring 112. The first and second load rings 121, 122 are positioned such that they resiliently support the first and second seal rings 111, 112 and drive the sealing faces 136 of the first and second seal rings 111, 112 together to define a band 142 of contact between the sealing bands 140. The first and second load rings 121, 122 act in the manner of a spring to apply an axial load respectively against the first and second seal rings 111, 112 in opposing directions along the longitudinal axis "LA" to bring the sealing faces 136 of the first and second seal rings 111, 112 into face-to-face sealing contact under pressure along the band 142 of contact such that a running, fluid-tight seal is formed.

The load ring engagement surfaces 130 of the first member 32 and the second member 34 are mirror images. The inclined loading surfaces 134 of the first and second seal rings 111, 112 are substantially identical to each other. Accordingly, it should be understood that the description below of the load ring engagement surface 130 of the first member 32 and the inclined loading surface 134 of the first seal ring 111 is applicable respectively to the load ring engagement surface 130 of the second member 34 and the inclined loading surface 134 of the second seal ring 112, as well. Furthermore, the description of the relationships between the first member 32, the first load ring 121, and the first seal ring 111 are also applicable to the relationships between the second member 34, the second load ring 122, and the second seal ring 112, as well.

The load ring engagement surface 130 of the first member 32 and the inclined loading surface 134 of the first seal ring 111 are in confronting, spaced apart relationship such that they define an annular load ring cavity 144 within which the first load ring 121 is disposed. The load ring engagement surface 130 of the first member 32 and the inclined loading surface 134 of the first seal ring 111 cooperate together to define a seal end restriction 148 adjacent the sealing face 136 of the first seal ring 111. The seal end restriction 148 is configured to help prevent the first load ring 121 from sliding axially off of the first seal ring 111 in a direction toward the second seal ring 112 and to help prevent the first load ring 121 from extending into a pinch point therein.

The load ring engagement surface 130 of the first member 32 extends axially from the outboard end portion 124 thereof and faces radially inwardly. The load ring engagement surface 130 of the first member 32 includes a peripheral retaining lip 160 adjacent the outboard end portion 124 of the first member 32 and an inclined load ramp portion 162. The inclined load ramp portion 162 is bounded by a seal end 166 adjacent the retaining lip 160 and a load end 167 disposed in spaced axial relationship to the seal end 166.

The peripheral retaining lip 160 projects radially inwardly relative to the seal end 166 of the inclined load ramp portion 162. The peripheral retaining lip 160 cooperates with the outer perimeter 138 of the sealing face 136 of the first seal ring 111 to define the seal end restriction 148.

A transition segment 174 can be provided between the peripheral retaining lip 160 and the seal end 166 of the inclined load ramp portion 162. In the illustrated embodiment, the transition segment 174 has a frusto-conical shape. In other embodiments, the transition segment 174 can have other configurations, such as a concave curved shape, for example.

The inclined load ramp portion 162 of the load ring engagement surface 130 extends between the seal end 166 and the load end 167. The load end 167 of the inclined load ramp portion 162 is further from the sealing face 136 of the first seal ring 111 along the longitudinal axis "LA" than the seal end 166 of the inclined load ramp portion 162.

The inclined load ramp portion 162 of the load ring engagement surface 130 extends circumferentially around the longitudinal axis "LA." The inclined load ramp portion 162 is bounded at the seal end 166 by the transition segment 174. The load end 167 of the inclined load ramp portion 162 is in distal relationship with respect to the sealing face 136 of the first seal ring 111. The inclined load ramp portion 162 is substantially frusto-conical and is inclined outwardly at a predetermined load ramp angle "θ" relative to the longitudinal axis "LA" such that the seal end 166 of the inclined load ramp portion 162 is disposed radially outwardly of the load end 167 thereof. In embodiments, the inclined load ramp portion 162 of the first member 32 inclines outwardly relative to the longitudinal axis "LA" in a direction from the load end 167 toward the seal end 166 thereof such that the load ramp angle "θ" is in a range between eight degrees and twenty degrees.

The inclined loading surface 134 of the first seal ring 111 faces radially outwardly and includes a seating portion 202, an inclined seal ramp portion 204, and a cylindrical portion 206. The inclined seal ramp portion 204 is disposed between the seating portion 202 and the cylindrical portion 206.

The seating portion 202 projects radially outwardly relative to the inclined seal ramp portion 204 and terminates at the outer perimeter 138 of the sealing face 136. The seating portion 202 radially overlaps with the band 142 of contact between the sealing faces 136. The seating portion 202 is generally concave and can be adapted to surroundingly engage the first load ring 121.

The inclined seal ramp portion 204 of the first seal ring 111 is bounded at a seal end 220 by the seating portion 202 and at a load end 222 by the cylindrical portion 206. The load end 222 of the inclined seal ramp portion 204 is in distal relationship with respect to the sealing face 136 of the first seal ring 111. The inclined seal ramp portion 204 is substantially frusto-conical and is inclined at a seal ramp angle "γ" relative to the longitudinal axis "LA" such that the seal end 220 of the inclined seal ramp portion 204 is disposed radially outwardly of the load end 222 thereof. In embodiments, inclined seal ramp portion 204 of the first seal ring 111 inclines outwardly relative to the longitudinal axis "LA" in a direction from the load end 222 toward the seal end 220 thereof such that the seal ramp angle "γ" is in a range between eight degrees and thirty-five degrees, and between eight and twenty degrees in other embodiments.

In embodiments, the seal ramp angle "γ" of the inclined seal ramp portion 204 of the first seal ring 111 can be substantially equal to the load ramp angle "θ" of the inclined load ramp portion 162 of the first member 32. In other embodiments, the seal ramp angle "γ" of the inclined seal ramp portion 204 of the first seal ring 111 can be less than the load ramp angle "θ" of the inclined load ramp portion 162 of the first member 32. In still other embodiments, the seal ramp angle "γ" of the inclined seal ramp portion 204 of the first seal ring 111 can be greater than the load ramp angle "θ" of the inclined load ramp portion 162 of the first member 32, as shown in FIG. 2.

The cylindrical portion 206 of the first seal ring 111 includes an external sidewall 225 that is substantially cylindrical and coaxial with the longitudinal axis "LA." The external sidewall 225 defines an outer perimeter 230 of the load end 131 of the first seal ring 111 to define a load end restriction 233 in cooperation with the first member 32.

Figure 3:
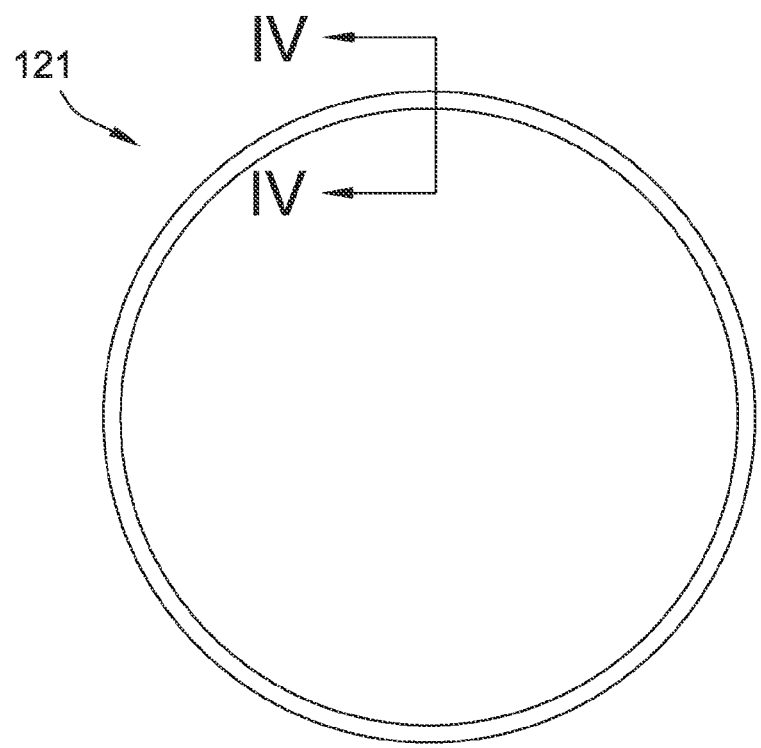
FIG. 3 is an axial end view of a load ring of the seal assembly of FIG. 2 in an unloaded condition.
Figure 4:
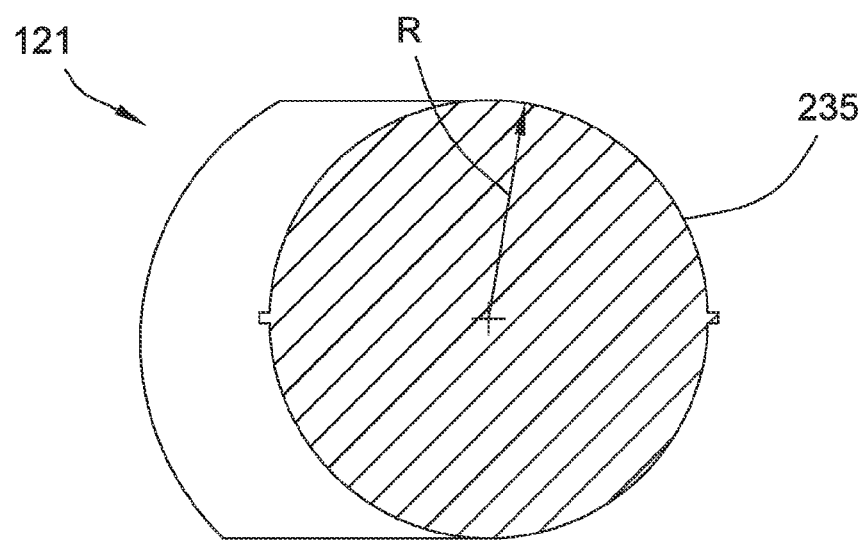
FIG. 4 is an enlarged, cross-sectional view taken along line IV-IV in FIG. 3.

Referring to FIGS. 3 and 4, the first load ring 121 is shown. The first and second load rings 121, 122 are substantially identical to each other. It should be understood, therefore, that the description of the first load ring 121 is applicable to the second load ring 122. The first load ring 121 is in the shape of an annulus. When the first load ring 121 is in an unloaded or uncompressed condition, it has a substantially circular cross-sectional shape 235, as shown in FIG. 4. The cross-sectional shape 235 has a predetermined cross-sectional radius "R" when in an unloaded condition (see FIG. 4).

Figure 6:
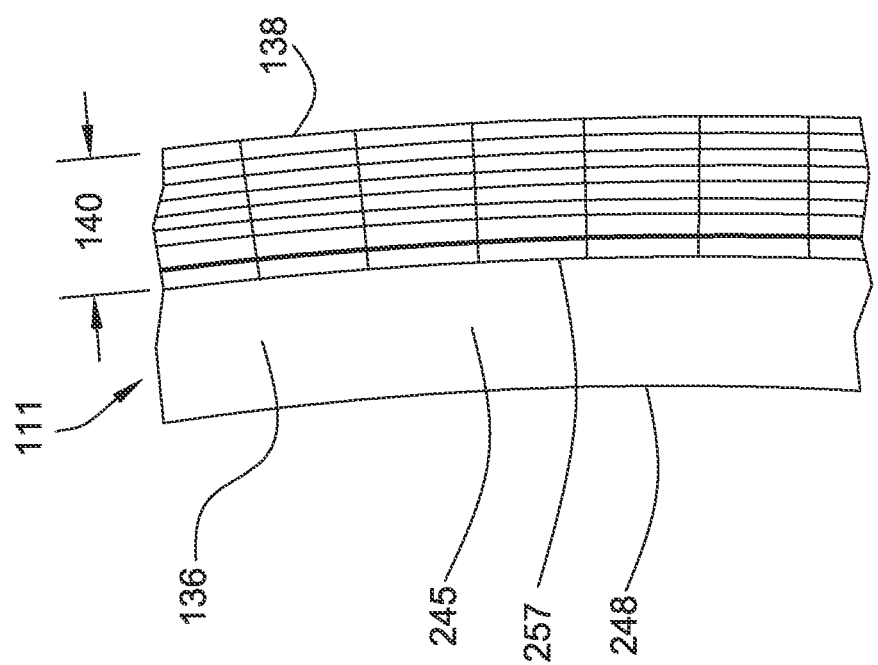
FIG. 6 is an enlarged, fragmentary view of the seal ring of FIG. 5 corresponding to the location encompassed by circle VI in FIG. 6.
Figure 5:
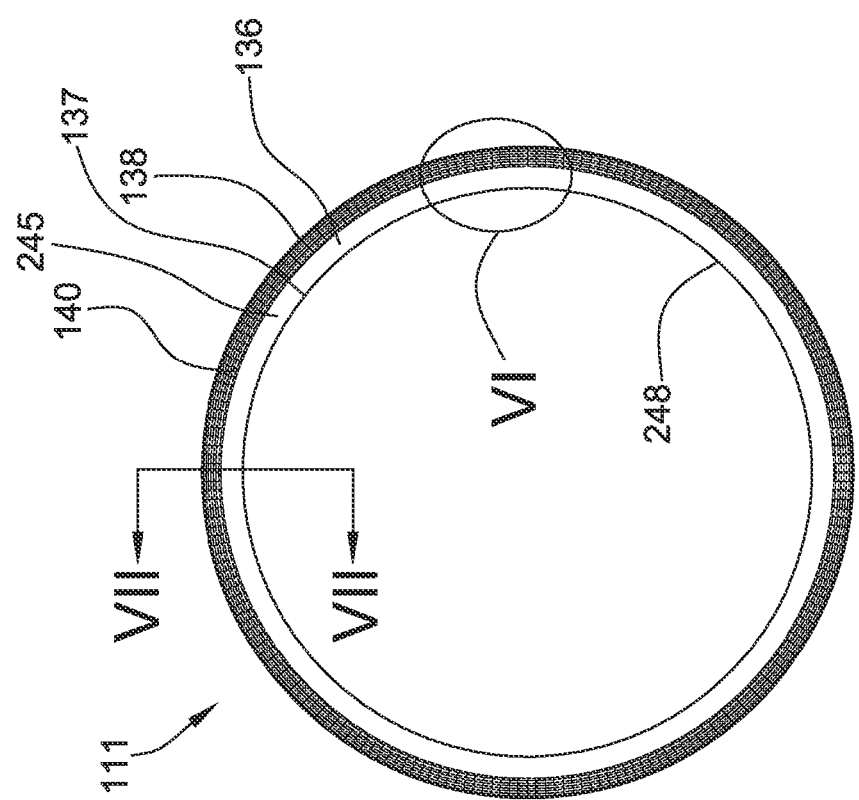
FIG. 5 is an axial end view of a seal ring of the seal assembly of FIG. 2.
Figure 7:
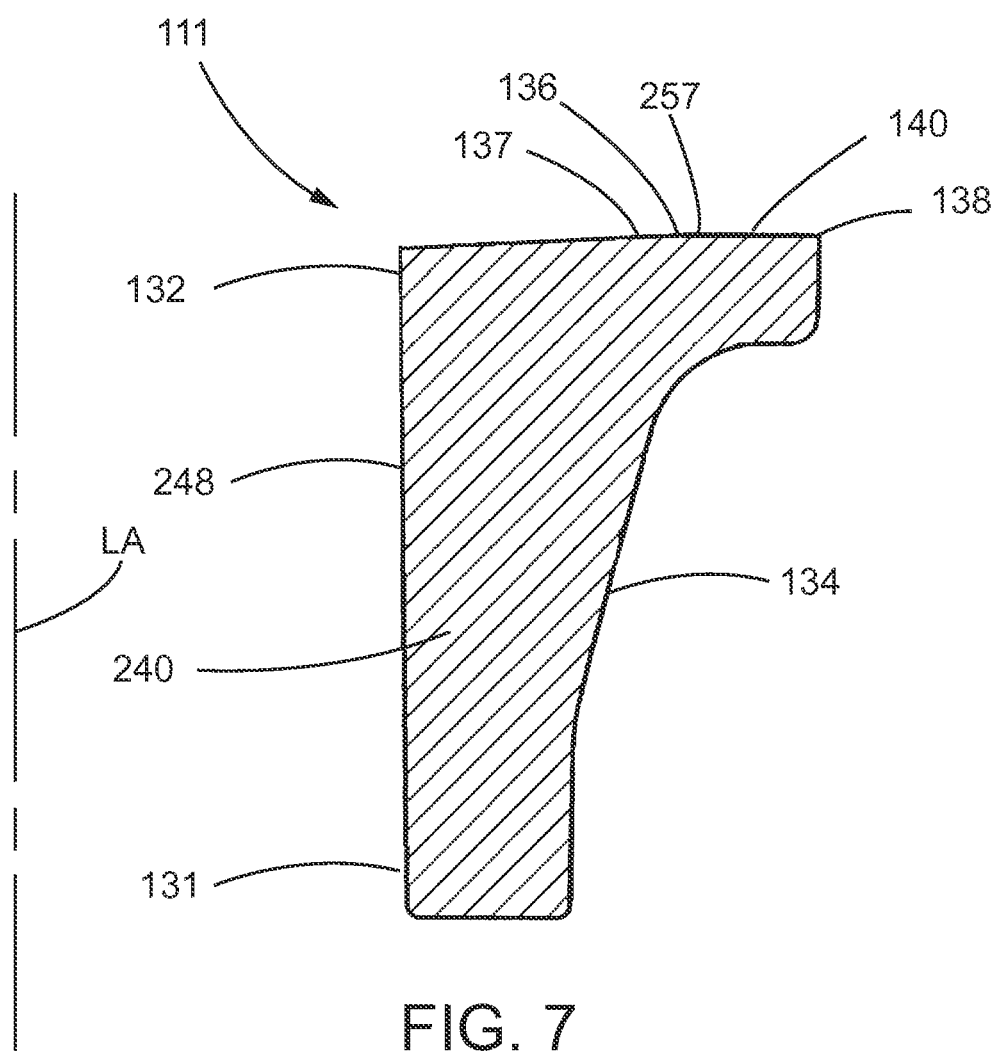
FIG. 7 is an enlarged, cross-sectional view taken along line VII-VII in FIG. 5.
Figure 8:
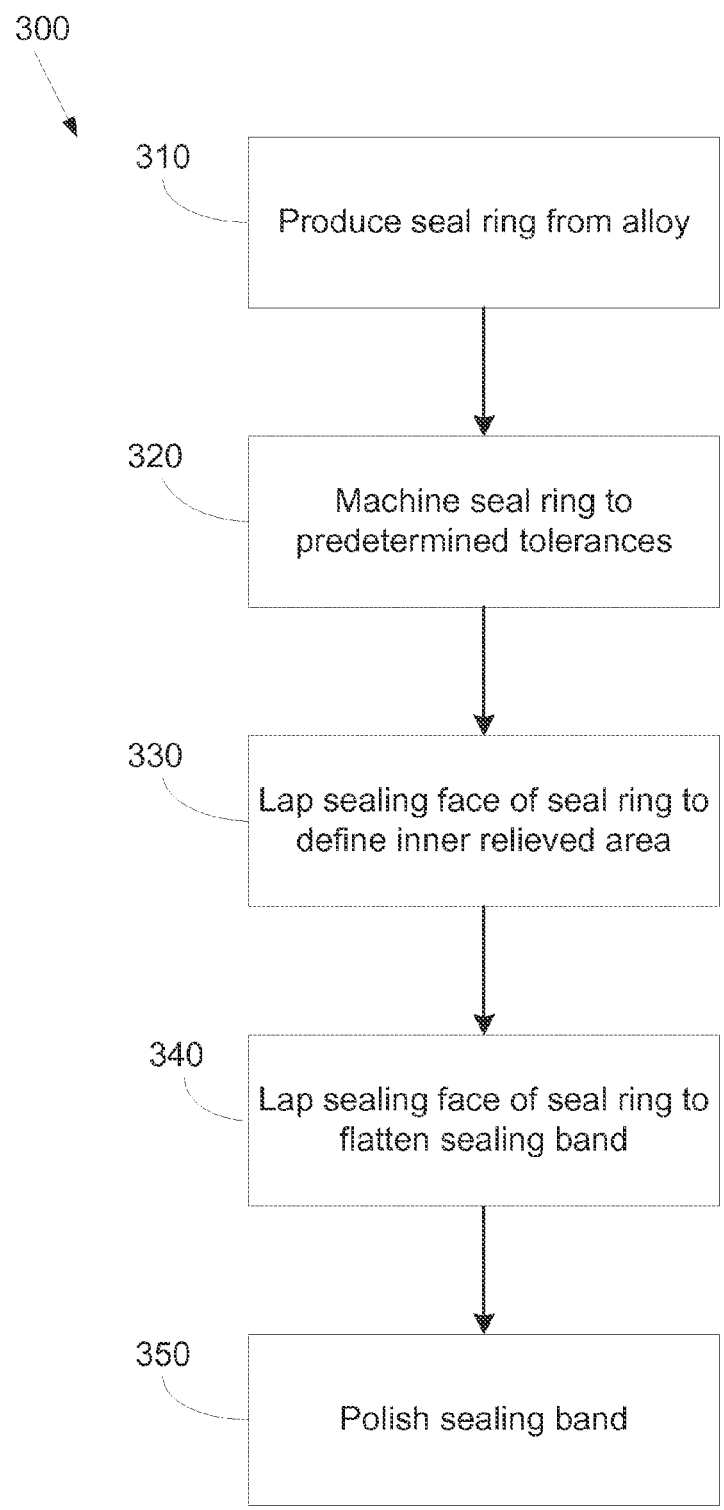
FIG. 8 is a flow chart illustrating steps of an embodiment of a method of making a seal ring for a seal assembly according to principles of the present disclosure.

Referring to FIGS. 5-7, the first seal ring 111 is shown. The first seal ring 111 is an example of an embodiment of a seal ring constructed according to principles of the present disclosure. The second seal ring 112 is substantially identical to the first seal ring 111. It should be understood, therefore, that the description of the first seal ring 111 is applicable to the second seal ring 112, as well.

Referring to FIGS. 5 and 6, the first seal ring 111 is in the shape of an annulus. The seal flange 137 includes the sealing face 136. The sealing face 136 includes the sealing band 140 disposed adjacent the outer perimeter 138 of the seal flange 137 and an inner relieved area 245 disposed between the sealing band 140 (which is shown as a hatched area in FIGS. 5 and 6 for illustrative purposes) and an inner perimeter 248 of the first seal ring 111. The inner relieved area 245 can be tapered between the sealing band 140 and the inner perimeter 248 such that the inner perimeter 248 is axially displaced from the sealing band 140 (see FIG. 2).

Referring to FIG. 7, the first seal ring 111 includes a cylindrical body 240 and the seal flange 137. The cylindrical body 240 extends along the longitudinal axis "LA" between the load end 131 and the seal end 132, which is in opposing relationship to the load end 131. The cylindrical body 240 includes the inner perimeter 248 which is substantially cylindrical and the majority of the inclined loading surface 134, which is in outer, radial spaced relationship to the inner perimeter 248.

The seal flange 137 is disposed at the seal end 132. The seal flange 137 projects radially from the cylindrical body 240 to the outer perimeter 138 thereof. The sealing face 136 is disposed on the seal flange 137 and extends radially with respect to the longitudinal axis "LA." The sealing band 140 can be substantially flat in cross-section between an inner radial edge 257 and the outer perimeter 138 (see FIG. 6 also). In embodiments, the sealing band 140 can include an outer relieved area disposed adjacent the outer perimeter 138 that is chamfered or tapered.

In embodiments, a seal ring for a seal assembly, such as the first and second seal rings 111, 112, is made from an alloy following principles of the present disclosure. In embodiments, an alloy for a seal ring of a seal assembly following principles of the present disclosure includes a decreased nickel content relative to conventional alloys used for making seal rings. In such embodiments, iron is used to replace some of the nickel content, and the alloy includes between 2 percent and 3 percent by weight of silicon. In embodiments, the silicon content of the alloy can be adjusted to maintain the castability of the iron-containing alloy. It should be understood that in other embodiments, an alloy following principles of the present disclosure can be used to make other types of seal rings having a different configuration from that of the seal rings 111, 112 illustrated in FIGS. 2 and 5-7, such as, heavy duty dual face metal face seals using Belleville washers; other types of duo-cone seal rings with different loading surfaces and/or sealing faces and/or used in conjunction with different shaped load rings or torics; and other seals for other seal assemblies, as will be appreciated by one skilled in the art.

In preferred embodiments, an alloy following principles of the present disclosure includes between 10 percent and 12 percent by weight of iron, between 2.4 percent and 2.6 percent by weight of silicon, and at least 65 percent by weight of nickel. In at least some of such embodiments, the alloy includes between 65 percent and 75 percent by weight of nickel.

In embodiments, an alloy following principles of the present disclosure can be relative softer than the material used to make conventional seal rings. In embodiments, a seal ring made from an alloy following principles of the present disclosure can have a hardness of between 50 HRC and 55 HRC.

In embodiments, an alloy for a seal ring of a seal assembly following principles of the present disclosure includes between 8 percent and 13 percent by weight of iron, between 2 percent and 3 percent by weight of silicon, between 13 percent and 14 percent by weight of chromium, and at least 65 percent by weight of nickel. In some of such embodiments, the alloy includes between 65 percent and 75 percent by weight of nickel. In some of such embodiments, the alloy also includes between 2 percent and 3 percent by weight of boron. In still others of such embodiments, the alloy also includes between 0.6 percent and 1 percent by weight of carbon. In embodiments, the alloy does not contain more than trace amounts of molybdenum, cobalt, manganese, copper, any two of the foregoing, any three of the foregoing, or all of the foregoing.

In embodiments, an alloy for a seal ring of a seal assembly following principles of the present disclosure includes between 8 percent and 13 percent by weight of iron. In still other embodiments, an alloy for a seal ring of a seal assembly following principles of the present disclosure includes between 9 percent and 12 percent by weight of iron. In yet other embodiments, an alloy for a seal ring of a seal assembly following principles of the present disclosure includes between 10 percent and 12 percent by weight of iron.

In embodiments, an alloy for a seal ring of a seal assembly following principles of the present disclosure includes between 2 percent and 3 percent by weight of silicon. In still other embodiments, an alloy for a seal ring of a seal assembly following principles of the present disclosure includes between 2.4 percent and 2.6 percent by weight of silicon. In yet other embodiments, an alloy for a seal ring of a seal assembly following principles of the present disclosure includes 2.5 percent by weight of silicon.

In embodiments, an alloy for a seal ring of a seal assembly following principles of the present disclosure includes between 13 percent and 14 percent by weight of chromium. In still other embodiments, an alloy for a seal ring of a seal assembly following principles of the present disclosure includes between 13 percent and 13.75 percent by weight of chromium.

In embodiments, an alloy for a seal ring of a seal assembly following principles of the present disclosure includes between 2 percent and 3 percent by weight of boron. In still other embodiments, an alloy for a seal ring of a seal assembly following principles of the present disclosure includes between 2.35 percent and 2.5 percent by weight of boron.

In embodiments, an alloy for a seal ring of a seal assembly following principles of the present disclosure includes between 0.6 percent and 1 percent by weight of carbon. In still other embodiments, an alloy for a seal ring of a seal assembly following principles of the present disclosure includes between 0.65 percent and 0.9 percent by weight of carbon.

In embodiments, an alloy for a seal ring of a seal assembly following principles of the present disclosure includes iron, silicon, chromium, boron, and carbon, and the balance being nickel (but may also include impurities). In embodiments, an alloy for a seal ring of a seal assembly following principles of the present disclosure includes between 10 percent and 12.5 percent by weight of iron, between 2.4 percent and 2.6 percent by weight of silicon, between 13 percent and 14 percent by weight of chromium, between 2.2 percent and 2.5 percent by weight of boron, between 0.6 percent and 0.8 percent by weight of carbon, and the balance being nickel (but may also include impurities).

Table I sets forth non-limiting exemplary embodiments of an alloy following principles of the present disclosure:

TABLE I

| Exemplary Embodiment of Alloy According to Present Disclosure | | | | | | |
|---|---|---|---|---|---|---|
| Embodiment | Fe | Si | Cr | B | C | Ni |
| 1 | 8-13 wt % | 2-3 wt % | 13-14 wt % | | | ≥65 wt % |
| 2 | 9-12 wt % | 2-3 wt % | 13-14 wt % | | | ≥65 wt % |
| 3 | 9-12 wt % | 2.4-2.6 wt % | 13-14 wt % | | | ≥65 wt % |
| 4 | 9-12 wt % | 2.4-2.6 wt % | 13-14 wt % | | | 65-75 wt % |
| 5 | 8-13 wt % | 2-3 wt % | 13-14 wt % | | | 65-75 wt % |
| 6 | 8-13 wt % | 2.4-2.6 wt % | 13-14 wt % | | | ≥65 wt % |
| 7 | 8-13 wt % | 2.4-2.6 wt % | 13-14 wt % | | | 65-75 wt % |
| 8 | 8-13 wt % | 2-3 wt % | 13-14 wt % | 2-3 wt % | | ≥65 wt % |
| 9 | 9-12 wt % | 2-3 wt % | 13-14 wt % | 2-3 wt % | | ≥65 wt % |

TABLE I-continued

Exemplary Embodiment of Alloy According to Present Disclosure

| Embodiment | Fe | Si | Cr | B | C | Ni |
|---|---|---|---|---|---|---|
| 10 | 9-12 wt % | 2.4-2.6 wt % | 13-14 wt % | 2-3 wt % | | ≥65 wt % |
| 11 | 8-13 wt % | 2.4-2.6 wt % | 13-14 wt % | 2-3 wt % | | ≥65 wt % |
| 12 | 8-13 wt % | 2.4-2.6 wt % | 13-14 wt % | 2-3 wt % | | 65-75 wt % |
| 13 | 8-13 wt % | 2-3 wt % | 13-14 wt % | 2-3 wt % | | 65-75 wt % |
| 14 | 8-13 wt % | 2-3 wt % | 13-14 wt % | | 0.6-1 wt % | ≥65 wt % |
| 15 | 9-12 wt % | 2-3 wt % | 13-14 wt % | | 0.6-1 wt % | ≥65 wt % |
| 16 | 9-12 wt % | 2.4-2.6 wt % | 13-14 wt % | | 0.6-1 wt % | ≥65 wt % |
| 17 | 8-13 wt % | 2.4-2.6 wt % | 13-14 wt % | | 0.6-1 wt % | ≥65 wt % |
| 18 | 8-13 wt % | 2.4-2.6 wt % | 13-14 wt % | | 0.6-1 wt % | 65-75 wt % |
| 19 | 8-13 wt % | 2-3 wt % | 13-14 wt % | | 0.6-1 wt % | 65-75 wt % |
| 20 | 8-13 wt % | 2-3 wt % | 13-14 wt % | 2-3 wt % | 0.6-1 wt % | ≥65 wt % |
| 21 | 8-13 wt % | 2-3 wt % | 13-14 wt % | 2-3 wt % | 0.6-1 wt % | 66-74.4 wt % |
| 22 | 9-12 wt % | 2-3 wt % | 13-14 wt % | 2-3 wt % | 0.6-1 wt % | ≥65 wt % |
| 23 | 8-13 wt % | 2.4-2.6 wt % | 13-14 wt % | 2-3 wt % | 0.6-1 wt % | ≥65 wt % |
| 24 | 8-13 wt % | 2.4-2.6 wt % | 13-14 wt % | 2-3 wt % | 0.6-1 wt % | 66.4-74 wt % |
| 25 | 8-13 wt % | 2.4-2.6 wt % | 13-13.75 wt % | 2.35-2.5 wt % | 0.65-0.9 wt % | 67.25-73.6 wt % |

In embodiments, an alloy for a seal ring of a seal assembly following principles of the present disclosure consists or consists essentially of iron, silicon, chromium, boron, and carbon, and the balance being nickel, but may contain trace amounts of impurities. For example, in embodiments, an alloy for a seal ring of a seal assembly following principles of the present disclosure can consist of one of the formulations of Embodiments 20-25 in Table I. In embodiments, an alloy for a seal ring of a seal assembly following principles of the present disclosure can consist essentially of one of the formulations of Embodiments 20-25 in Table I.

In embodiments, an alloy for a seal ring of a seal assembly following principles of the present disclosure consists essentially of between 8 percent and 13 percent by weight of iron, between 2 percent and 3 percent by weight of silicon, between 13 percent and 14 percent by weight of chromium, between 2 percent and 3 percent by weight of boron, between 0.6 percent and 1 percent by weight of carbon, and between 66 percent and 74.4 percent by weight of nickel, but may contain trace amounts of impurities. In embodiments, an alloy for a seal ring of a seal assembly following principles of the present disclosure consists essentially of between 9 percent and 12 percent by weight of iron, between 2.4 percent and 2.6 percent by weight of silicon, between 13 percent and 14 percent by weight of chromium, between 2 percent and 3 percent by weight of boron, between 0.6 percent and 1 percent by weight of carbon, and between 67.4 percent and 73 percent by weight of nickel, but may contain trace amounts of impurities. In embodiments, an alloy for a seal ring of a seal assembly following principles of the present disclosure consists essentially of between 8 percent and 13 percent by weight of iron, between 2.4 percent and 2.6 percent by weight of silicon, between 13 percent and 13.75 percent by weight of chromium, between 2.35 percent and 2.5 percent by weight of boron, between 0.65 percent and 0.9 percent by weight of carbon, and between 67.25 percent and 73.6 percent by weight of nickel, but may contain trace amounts of impurities.

A seal ring constructed according to principles of the present disclosure can be made using any suitable technique known to those skilled in the art. For example, a seal ring blank or "button" can be made by any suitable technique, such as by being stamped and formed, or cast, for example. The seal ring button can be machined by any suitable technique, such as by using a lathe for lathe-turning and/or grinder for grinding operations, for example, to achieve the desired configuration for the seal ring. The seal ring can be machined such that the thickness of the seal flange is within a predetermined tolerance, the seal ramp angle is within a predetermined tolerance, and other dimensional tolerances are met, for example. It should be understood that dimensional details relating to the seal ring, and other components of a seal assembly, constructed according to principles of the present disclosure as described herein are nominal values. Similarly, is should be understood that the percent weight values for the components of various embodiments of an alloy following principles of the present disclosure are expressed as nominal values. It is contemplated that suitable tolerance variations are also included within the described nominal values, as will be appreciated by one skilled in the art.

Figure 11:
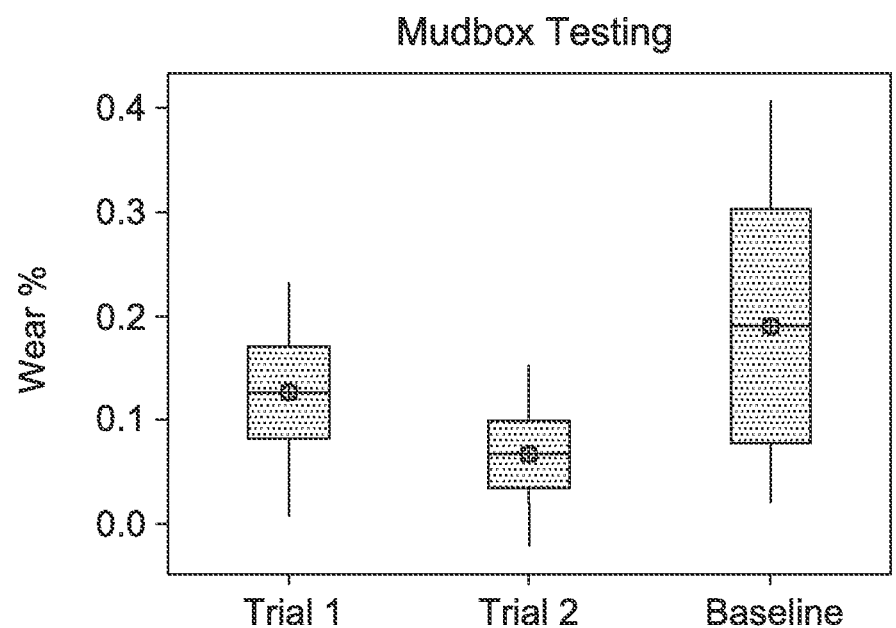
FIG. 11 is a plot of wear percentage experienced by embodiments of a seal ring made from embodiments of an alloy following principles of the present disclosure compared to a seal ring made from a conventional alloy in a mudbox testing apparatus.

Referring to FIG. 11, steps of an embodiment of a method 300 for preparing a seal ring for a seal assembly in accordance with principles of the present disclosure are shown. The seal ring is produced from an alloy following principles of the present disclosure (step 310). The seal ring is machined to at least one predetermined tolerance (step 320). The sealing face of the seal ring is lapped to define an inner relieved area (step 330). The sealing face of the seal ring is lapped to flatten a sealing band (step 340). The sealing band is polished (step 350).

The seal ring can be produce in step 310 using any suitable technique, such as by being stamped and formed or cast, for example. In embodiments, the seal ring is preferably produced by a casting technique. In embodiments, the seal ring can be produced using any suitable casting technique, such as by a static cast process, for example.

In embodiments, the alloy includes between 8 percent and 13 percent by weight of iron, between 2 percent and 3 percent by weight of silicon, between 13 percent and 14 percent by weight of chromium, and at least 65 percent by weight of nickel. In embodiments, the alloy includes between 2 percent and 3 percent by weight of boron and between 0.6 percent and 1 percent by weight of carbon. In still other embodiments, the alloy includes between 2.4 percent and 2.6 percent by weight of silicon and between 66.4 percent and 74 percent by weight of nickel. In yet other embodiments, any alloy following principles of the present disclosure can be used to produce the seal ring.

In embodiments, the seal ring can be produced with an alloy following principles of the present disclosure such that the seal ring is relatively softer than conventional seal rings.

In embodiments, the seal ring can be produced with an alloy following principles of the present disclosure such that the seal ring has a hardness of between 50 HRC and 55 HRC.

In step 320, the seal ring can be machined by any suitable technique, such as by using a lathe for lathe-turning and/or grinder for grinding operations, for example. The seal ring can be machined such that the thickness of the seal flange is within a predetermined tolerance, the seal ramp angle is within a predetermined tolerance, and other dimensional tolerances are met, for example. In embodiments where the seal ring has a hardness of between 50 HRC and 55 HRC, the machinability of the seal ring can be enhanced.

In step 330, the sealing face can be lapped using any suitable technique, such as with a spherical lap, for example, to define the inner relieved area. In step 340, the sealing face can be lapped using any suitable technique, such as with a flat lap, for example, to flatten the sealing band. In embodiments, the sealing band can be polished in step 340 using any suitable technique.

EXAMPLES

Example 1

Figure 9:
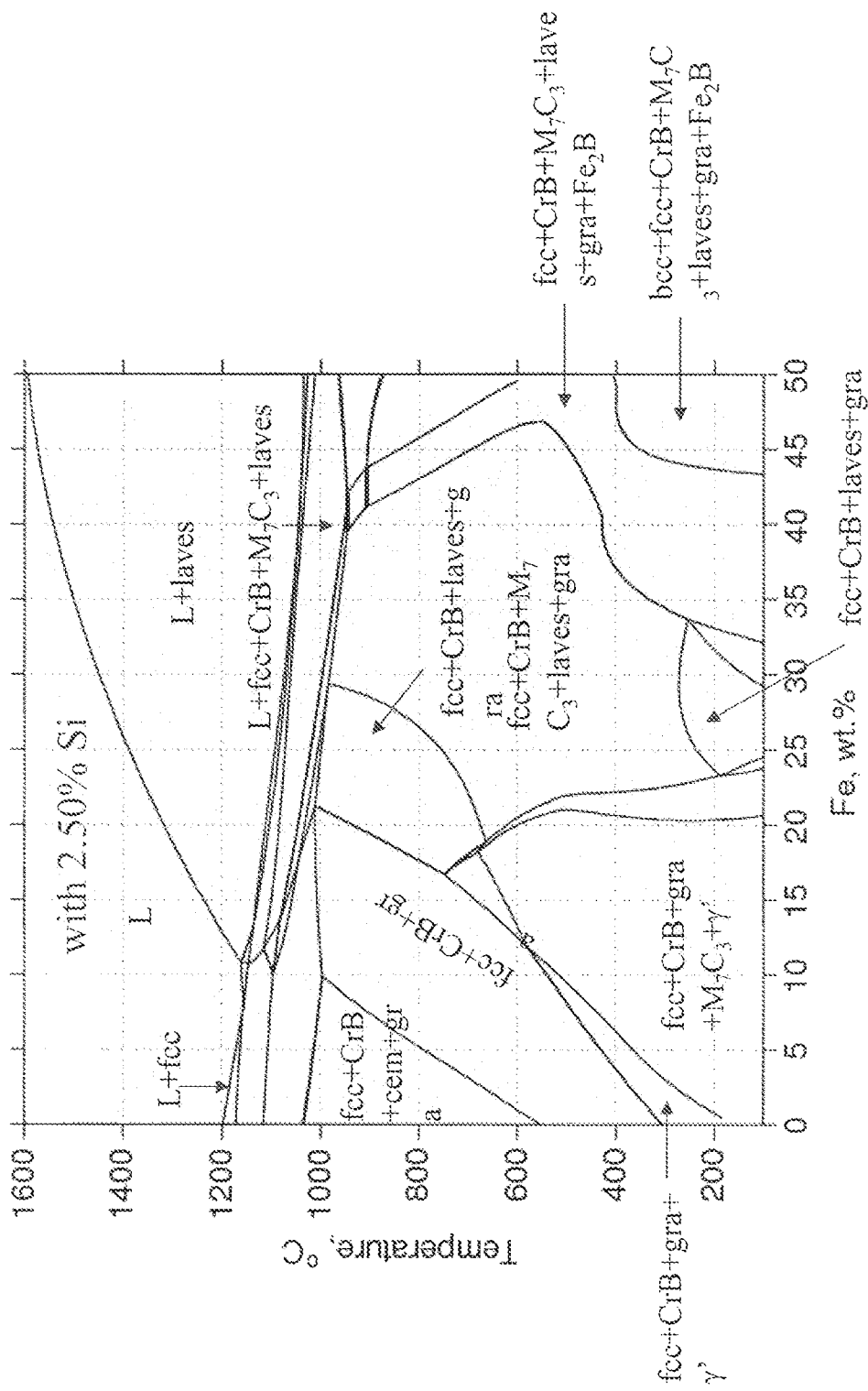
FIG. 9 is a phase equilibrium diagram for an embodiment of an alloy according to principles of the present disclosure.

In this Example, a phase equilibrium diagram for an embodiment of an alloy according to principles of the present disclosure was evaluated. FIG. 9 is a phase equilibrium diagram for an embodiment of an alloy according to principles of the present disclosure. In this Example, the alloy includes 2.5 percent by weight of silicon, 13.5 percent by weight of chromium, 2.6 percent by weight of boron, and 0.8 percent by weight of carbon. The percentage by weight of iron varies along the X-axis and the balance of the alloy is nickel. As shown in FIG. 9, a range including 10 percent by weight of iron (e.g., between 8 percent and 13 percent by weight of iron) is shown to produce an equilibrium condition that is considered to be feasible for use in making a seal ring.

Example 2

In this Example, seal rings were made using embodiments of an alloy according to principles of the present disclosure and a comparative baseline alloy following a conventional formulation, which is commercially available from Caterpillar Inc. and referred to as "C6." The composition of the alloys is set forth below in Table II. The Trial 1 and Trial 2 alloys follow principles of the present disclosure, and the C6 alloy follows a conventional formulation used as a baseline comparator.

TABLE II

Chemistry Targets for Casting Trials

| | C6 | Trial 1 | | | Trial 2 | | |
|---|---|---|---|---|---|---|---|
| | aim | min | max | aim | min | max | aim |
| Carbon | 0.75 | 0.65 | 0.90 | 0.75 | 0.65 | 0.90 | 0.75 |
| Silicon | 4.90 | 2.40 | 2.60 | 2.50 | 2.40 | 2.60 | 2.50 |
| Chromium | 13.35 | 13.00 | 13.75 | 13.35 | 13.00 | 13.75 | 13.35 |
| Boron | 2.40 | 2.35 | 2.50 | 2.40 | 2.35 | 2.50 | 2.40 |
| Iron | 2.50 | 11.00 | 13.00 | 12.00 | 8.00 | 10.00 | 9.00 |
| Nickel | 76.10 | 70.60 | 67.25 | 69.00 | 73.60 | 70.25 | 72.00 |

The three alloys were melted in a production furnace and brought to a pour temperature of 1350° C. The three melted alloys were used in a static casting process to form seal rings of the same nominal size and geometric configuration. The seal rings were machined to tolerance using production lathes with standard tool inserts and prepared for pressure velocity and mudbox testing.

In the PV testing, a test fixture designed is used which holds the seal rings being tested in sealing relationship with respect to each other as they would be oriented during ordinary use in the their intended application with the test fixture providing a predetermined seal gap. The fixture contains a seal cavity which is filled to a center fill line with oil. The sealing faces of the contacting seal rings are subjected to an axial pressure, and one seal ring is rotated relative to the other seal ring at an initial rotational velocity. All of the seal rings were subjected to PV testing with the same load and seal gap settings.

The PV testing begins with the rotating seal ring moving at 25 rpm in a rotational cycle of four minutes in a forward direction, one minute stopped, four minutes in a reverse direction, and one minute stopped. The seal rings are monitored for failure using a thermocouple configured to detect failures such as scoring, galling, and leaks. The rotational velocity is increased in 25 rpm increments until failure.

Figure 10:
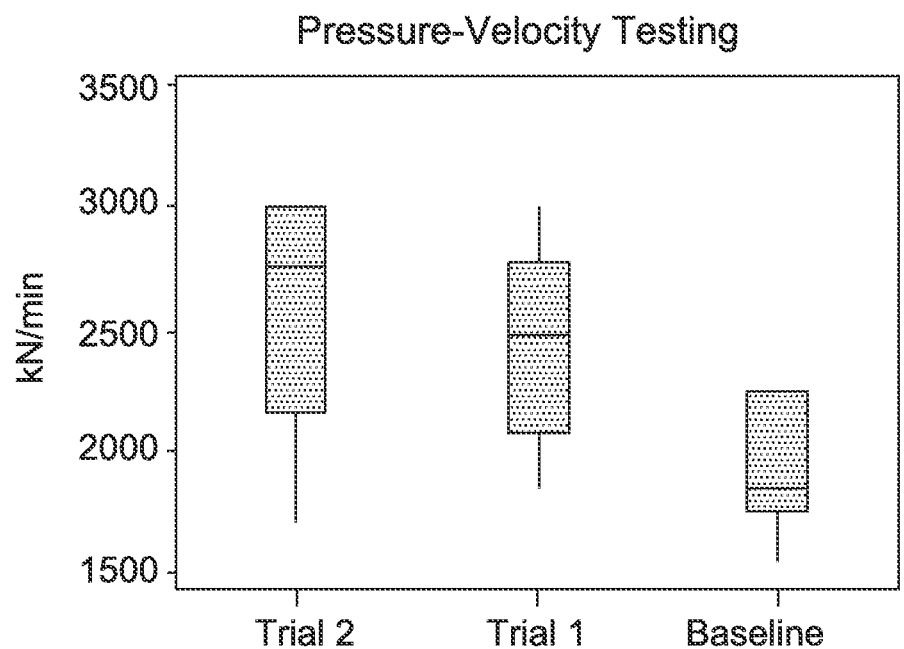
FIG. 10 is a plot of pressure velocity data (in kN/min) for embodiments of a seal ring made from embodiments of an alloy following principles of the present disclosure compared to a seal ring made from a conventional alloy.

Referring to FIG. 10, the results of the pressure velocity (PV) testing are shown. The Y-axis shows the range of values attained for product of the face pressure and relative rotational speed of the seal rings at failure. The PV testing shows that seal rings made from alloys following principles of the present disclosure (Trial 1 and Trial 2 seal rings) exhibited the same or better performance (higher PV values) in PV testing as conventional seal rings (C6 seal rings).

The mudbox testing is performed in a test assembly which includes three boxes each with one shaft. Pairs of seal rings from the Baseline, Trial 1, and Trial 2 runs were mounted on each shaft in mating face-to-face sealing relationship with each other. Each pair of mating seal rings is loaded with the same face load and seal gap setting. The shafts are driven for a break in period of 5000 cycles in a dry condition (i.e., no mud is added to the boxes).

The shafts are rotated at the same rotational velocity. Each cycle includes 20 seconds in a forward direction, twenty seconds of dwell, twenty seconds in a reverse direction, and twenty second of dwell. After the break-in period, the seals are examined and a band of contact is measured on the sealing face of each seal ring.

The pairs of seal rings are reset with the same face load and seal gap setting and are run through an additional 15,000 cycles of the shaft, but this time with each box containing mud in a similar manner. The additional cycles are the same as those run when dry. After the additional cycles are run with mud in the box, the seals are examined and the band of contact is measured on the sealing face of each seal ring to determine the wear of the seal ring which is manifested as a decreased wear band on the sealing face.

Referring to FIG. 11, the results of the mudbox testing are shown. The Y-axis shows the range of percent wear of the seal rings during the mudbox test. The wear percentage is calculated as the difference between the original band of contact measured after the break in period and the decreased wear band after the mud cycles are performed expressed as a percentage of the original band of contact. The mudbox testing shows that seal rings made from alloys following principles of the present disclosure (Trial 1 and Trial 2 seal rings) exhibited the same or better performance (lower wear percentage) in mudbox testing as conventional seal rings (C6 seal rings).

INDUSTRIAL APPLICABILITY

The industrial applicability of the embodiments of an alloy for a seal ring, a seal ring for a seal assembly, and a method of making a seal ring described herein will be readily appreciated from the foregoing discussion. The described principles are applicable to machines and equipment including a wheel assembly such that one member is rotatably movable with respect to the other member. A wheel assembly can include at least one seal assembly constructed in accordance with the present principles. In other embodiments, a seal ring constructed according to principles of the present disclosure can be used in a seal assembly used in a different application, such as a slurry pump auger or a pin joint assembly for a linkage assembly, for example. Examples of such machines include compaction machines, including a wheel loader, for example. The seal rings disclosed herein can advantageously be offered on new equipment, or can be used to retrofit existing equipment operating in the field.

During use, the first and second seal rings 111, 112 help prevent lubricant (not shown) from leaking out of the respective cavities. The first and second seal rings 111, 112 provide a running seal therebetween. Specifically, the first and second seal rings 111, 112 rotate relatively against one another in sealing engagement. The first and second load rings 121, 122 act in the manner of a spring to apply an axial load respectively against the first and second seal rings 111, 112 in opposing directions along the longitudinal axis "LA" to bring the sealing bands 140 of the first and second seal rings 111, 112 into face-to-face sealing contact under pressure such that a running fluid-tight seal is formed. The structure of the seal cavity 40 can help maintain the first and second load rings 121, 122 in proximal relationship to the first and second seal rings 111, 112, respectively, to promote the opposing axial forces exerted by the first and second seal rings 111, 112 against each other. Accordingly, fluid can be restrained from escaping from the seal cavity 40 under difficult loading conditions.

The first and second seal rings 111, 112 can be made from an alloy following principles of the present disclosure by a suitable casting technique. An alloy following principles of the present disclosure can exhibit good castability behavior and be readily machinable to improve the manufacturing process. An alloy following principles of the present disclosure can exhibit corrosion resistance. Surprisingly and unexpectedly, seal rings made from an alloy following principles of the present disclosure can be relatively softer than conventional seal rings (such as a hardness of between 50 HRC and 55 HRC) while still maintaining adequate sealing between the seal rings 111, 112 such that an effective fluid tight seal can be produced readily upon installation of the first and second seal rings 111, 112 in a joint.

Advantageously, an alloy following principles of the present disclosure can be used to produce a seal ring button that is relatively softer than conventional seal rings such as by having a hardness of between 50 HRC and 55 HRC. When the seal ring buttons are machined to final dimensions, such as by using a lather, the lathe can have increased tool life compared to when machining conventional, harder seal rings. The lapping of the sealing faces of the seal rings can be accomplished (such as by spherical lapping) in about half the time of conventional, harder seal rings, thereby increasing productivity.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. An alloy for a seal ring of a seal assembly, the alloy comprising:
    between 8 percent and 13 percent by weight of iron;
    between 2.4 percent and 2.6 percent by weight of silicon;
    between 13 percent and 13.75 percent by weight of chromium;
    between 67.25 percent and 73.6 percent by weight of nickel;
    between 2.35 percent and 2.5 percent by weight of boron; and
    between 0.65 percent and 0.9 percent by weight of carbon.
2. The alloy of claim 1, wherein the alloy includes between 9 percent and 12 percent by weight of iron.
3. The alloy of claim 1, wherein the alloy includes between 10 percent and 12 percent by weight of iron.
4. The alloy of claim 1, wherein the alloy includes between 11 percent and 13 percent by weight of iron.
5. The alloy of claim 4, wherein the alloy includes between 67.25 percent and 71 percent by weight of nickel.
6. The alloy of claim 1, wherein the alloy includes between 8 percent and 10 percent by weight of iron.
7. The alloy of claim 6, wherein the alloy includes between 70 percent and 73.6 percent by weight of nickel.
8. The alloy of claim 1, wherein the alloy includes between 67.25 percent and 71 percent by weight of nickel.
9. The alloy of claim 1, wherein the alloy includes between 70 percent and 73.6 percent by weight of nickel.
10. A seal ring for a seal assembly comprising:
    a body, the body being generally cylindrical and extending along a longitudinal axis between a load end and a seal end;
    a seal flange, the seal flange disposed at the seal end of the body, the seal flange circumscribing the body and projecting radially from the body to a distal perimeter of the seal flange, the seal flange including a sealing face, the sealing face being annular and disposed adjacent the distal perimeter;
    wherein the seal ring is made from an alloy, the alloy including:
        between 8 percent and 13 percent by weight of iron;
        between 2.4 percent and 2.6 percent by weight of silicon;
        between 13 percent and 13.75 percent by weight of chromium;
        between 67.25 percent and 73.6 percent by weight of nickel;
        between 2.35 percent and 2.5 percent by weight of boron; and
        between 0.65 percent and 0.9 percent by weight of carbon.

11. The seal ring of claim 10, further comprising:
a loading surface, the loading surface extending along the longitudinal axis including an inclined seal ramp portion having a frusto-conical shape and inclining outwardly relative to the longitudinal axis in a direction from the load end toward the sealing face.

12. The seal ring of claim 10, wherein the seal ring has a hardness of between 50 HRC and 55 HRC.

13. The seal ring of claim 10, wherein the alloy includes between 10 percent and 12 percent by weight of iron.

14. The seal ring of claim 10, wherein the alloy includes between 11 percent and 13 percent by weight of iron.

15. The seal ring of claim 10, wherein the alloy includes between 8 percent and 10 percent by weight of iron.

16. The seal ring of claim 10, wherein the alloy includes between 67.25 percent and 71 percent by weight of nickel.

17. The seal ring of claim 10, wherein the alloy includes between 70 percent and 73.6 percent by weight of nickel.

18. A method of making a seal ring, the method comprising:
producing a seal ring from an alloy;
machining the seal ring to at least one predetermined tolerance;
wherein the alloy includes:
between 8 percent and 13 percent by weight of iron;
between 2.4 percent and 2.6 percent by weight of silicon;
between 13 percent and 13.75 percent by weight of chromium;
at least between 67.25 percent and 73.6 percent by weight of nickel;
between 2.35 percent and 2.5 percent by weight of boron; and
between 0.65 percent and 0.9 percent by weight of carbon.

19. The method of claim 18, further comprising:
lapping a sealing face of the seal ring to define an inner relieved area; and
lapping the sealing face of the seal ring to flatten a sealing band.

20. The method of claim 18, wherein the seal ring is produced such that the seal ring has a hardness of between 50 HRC and 55 HRC.

* * * * *

UNITED STATES PATENT AND TRADEMARK OFFICE
CERTIFICATE OF CORRECTION

| | | |
|---|---|---|
| PATENT NO. | : 9,528,171 B2 | Page 1 of 1 |
| APPLICATION NO. | : 14/827853 | |
| DATED | : December 27, 2016 | |
| INVENTOR(S) | : Barnes et al. | |

It is certified that error appears in the above-identified patent and that said Letters Patent is hereby corrected as shown below:

In the Claims

Column 18, Line 7, In Claim 18, delete "at least between" and insert -- between --.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*